US008766598B2

(12) United States Patent
Oh et al.

(10) Patent No.: US 8,766,598 B2
(45) Date of Patent: Jul. 1, 2014

(54) CHARGE EQUALIZATION APPARATUS WITH PARALLEL CONNECTION OF PRIMARY WINDINGS OF MULTIPLE TRANSFORMERS

(75) Inventors: Jeon Keun Oh, Daejeon (KR); Joong Hui Lee, Daejeon (KR); Soo Yeup Jang, Daejeon (KR); Gun Woo Moon, Daejeon (KR); Chong Eun Kim, Daejeon (KR); Hong Sun Park, Daejeon (KR)

(73) Assignees: SK Innovation Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 1134 days.

(21) Appl. No.: 12/303,628

(22) PCT Filed: Jun. 12, 2007

(86) PCT No.: PCT/KR2007/002828
§ 371 (c)(1),
(2), (4) Date: Jul. 20, 2010

(87) PCT Pub. No.: WO2007/145459
PCT Pub. Date: Dec. 21, 2007

(65) Prior Publication Data
US 2010/0283433 A1 Nov. 11, 2010

(30) Foreign Application Priority Data
Jun. 15, 2006 (KR) .......... 10-2006-0054055

(51) Int. Cl.
*H02J 7/00* (2006.01)
(52) U.S. Cl.
USPC .......... 320/119; 320/162
(58) Field of Classification Search
USPC .......... 320/119
See application file for complete search history.

(56) References Cited

U.S. PATENT DOCUMENTS

| 5,594,320 A | 1/1997 | Pacholok et al. |
| 5,646,504 A | 7/1997 | Feldstein |
| 5,659,237 A * | 8/1997 | Divan et al. .......... 320/119 |

(Continued)

FOREIGN PATENT DOCUMENTS

| EP | 0432639 B1 | 5/1995 |
| JP | 2002-125325 A | 4/2002 |

OTHER PUBLICATIONS

A Japanese Patent Office Action for JP 2009-515301, which was issued on Mar. 26, 2012, which corresponds to this present application.

*Primary Examiner* — Drew A Dunn
*Assistant Examiner* — Robert Grant
(74) *Attorney, Agent, or Firm* — McDermott Will & Emery LLP

(57) ABSTRACT

The present invention relates, in general, to a charge equalization apparatus for batteries and, more particularly, to a charge equalization apparatus, in which the primary windings (M11 to M1N) of a number of transformers (T1 to TN) corresponding to the number of battery cells are connected in parallel with each other, a switch (S) for controlling the flow of current of the primary windings (M11 to M1N) of the parallel-connected transformers is connected in series with the parallel-connected primary windings, respective secondary windings (M21 to M2N) corresponding to the primary windings are connected in parallel with the battery cells, and the battery cells are connected in series with each other.

6 Claims, 4 Drawing Sheets

(56) References Cited

U.S. PATENT DOCUMENTS

| | | |
|---|---|---|
| 5,965,996 A | 10/1999 | Arledge et al. |
| 6,538,414 B1 * | 3/2003 | Tsuruga et al. ................ 320/119 |
| 6,586,910 B2 * | 7/2003 | Matsui et al. ................. 320/122 |

* cited by examiner

CHARGE EQUALIZATION APPARATUS WITH PARALLEL CONNECTION OF PRIMARY WINDINGS OF MULTIPLE TRANSFORMERS

CROSS-REFERENCE OF RELATED APPLICATIONS

This application is the US National Phase Application under 35 U.S.C. §371 of International Patent Application No. PCT/KR2007/002828 filed Jun. 12, 2007, which claims priority to and the benefit of Korean Patent Application No. 10-2006-0054055, filed Jun. 15, 2006, each of which are hereby incorporated by reference in their entireties. The International Application published as WO 2007/145459 on Dec. 21, 2007.

TECHNICAL FIELD

The present invention relates, in general, to a charge equalization apparatus for batteries and, more particularly, to a charge equalization apparatus, in which the primary windings of a number of transformers corresponding to the number of battery cells are connected in parallel with each other, a switch for controlling the flow of current of the primary windings of the parallel-connected transformers is connected in series with the parallel-connected primary windings, respective secondary windings corresponding to the primary windings are connected in parallel with the battery cells, and the battery cells are connected in series with each other.

BACKGROUND ART

A plurality of systems uses a battery implemented as a battery pack or battery array; including a plurality of battery cells connected in series with each other.

When such a battery cell is charged to a much higher voltage or a much lower voltage than the voltage within a rated charge range, it may be dangerous.

Imbalance in the charged state of battery cells is caused by various factors, and occurs during the manufacture of batteries or the charge/discharge of batteries. In the case of lithium ion cells, the manufacture of cells is strictly controlled within a company to minimize the differences between the capacities of the cells of a battery array. However, imbalance or inequality between cells may occur due to various factors, regardless of the states of the cells, in which balance or equality is maintained after the cells are initially manufactured.

The factors influencing the imbalance of cells may include, for example, the chemical reactions, impedances and self-discharge rates of respective cells, reduction of the capacities of the cells, variation in the operating temperatures of the cells, and other types of variation between the cells.

Inconsistency in the temperature of cells is an important factor responsible for causing imbalance in cells. For example, "self-discharge" is caused in a battery cell, and is a function of a battery temperature. A battery having a high temperature typically has a self-discharge rate higher than that of a battery having a low temperature. As a result, the battery having a high temperature exhibits a lower charged state than the battery having a low temperature, with the passage of time.

Imbalance is a very series problem in the charged state of a battery. For example, this problem may typically occur in electric vehicles, and the capability of a battery to supply energy is limited by the battery cell having the lowest charged state.

If one of series-connected batteries is fully consumed, other battery cells lose the ability to continue to supply energy. This is the same even if the other battery cells of the battery still have the ability to supply power. Therefore, an imbalance in the charged state of battery cells reduces the power supply capability of the battery.

Of course, the above description does not mean that when one or more battery cells are consumed the supply of power by the remaining battery cells is completely impossible. However, it means that, only in the case of series connection, even if one or more battery cells are fully consumed, the battery can be continuously used as long as charge remains in the remaining battery cells, but, in that case, voltage having a reversed polarity is generated in the battery cell which has been fully discharged, and, as a result, the battery cell may be in danger of explosion due to the overheating thereof, or due to the generation of gas, and thus the battery loses power supply capability.

Various methods of correcting an imbalance in the charged state of battery cells have been proposed, and one of the methods is shown in FIG. 1.

FIG. 1 is a diagram showing the construction of a conventional centralized charge equalization apparatus having series-connected battery cells.

Referring to FIG. 1, the conventional centralized charge equalization apparatus having series-connected battery cells is constructed such that the common core of a transformer T is provided, a single primary winding M1 is wound around the common core, and a number of secondary windings M21 to M2N corresponding to the number of battery cells B1 to BN is wound around the common core. The secondary windings M21 to M2N have the same number of turns and have the same polarity, that is, a negative polarity. In this case, the fact that the polarity of the secondary windings M21 to M2N is a negative polarity means that dots are marked on the lower portions of respective windings.

Only a single primary winding M1 is wound around the common core of the transformer T, and a switch S is connected in series with the primary winding M1, which has polarity opposite that of the secondary windings M21 to M2N.

The switch S functions to turn on/off current flowing through the primary winding M1, connected in series with the switch S, and performs ON/OFF operation in response to a control signal output from a voltage sensing and switch drive signal generation unit 100.

Rectifier diodes D1 to DN are connected in series with respective secondary windings M21 to M2N wound around the common core of the transformer T, and battery cells B1 to BN are connected in parallel with respective secondary windings M21 to M2N.

Further, the battery cells B1 to BN are connected to the voltage sensing and switch drive signal generation unit 100.

The voltage sensing and switch drive signal generation unit 100 senses the voltages of respective battery cells B1 to BN, connected thereto, and turns on/off the switch S on the basis of the sensed voltages, thus maintaining the voltages of the series-connected battery cells B1 to BN at a uniform voltage.

That is, the voltage sensing and switch drive signal generation unit 100 senses the voltages of respective battery cells B1 to BN, and turns on the switch S when the voltage of a specific battery cell B1 to BN is higher than a preset voltage. Charge is discharged from the series-connected battery cells B1 to BN and is converted into magnetic energy by the transformer T, and the magnetic energy is stored in the transformer T. When the switch S is turned off, the magnetic energy is converted back into charge, and the charge moves to respective battery cells B1 to BN through the secondary windings M21 to M2N and the rectifier diodes D1 to DN. At this time, a small amount of charge moves to a battery cell B1 to BN having a high voltage, whereas a large amount of charge moves to a battery cell B1 to BN having a low voltage, thus equalizing the charge of the battery cells.

The conventional centralized charge equalization apparatus is advantageous in that it controls the flow of charge using only a single switch. However, the conventional centralized charge equalization apparatus is problematic in that, since a number of secondary windings corresponding to the number of battery cells is wound around a single common core, it is difficult to wind secondary windings around a single common core under optimized conditions.

In detail, in the conventional centralized charge equalization apparatus, a number of secondary windings corresponding to the number of battery cells and wound around a common core must be wound to have the same characteristics. For this operation, a number of secondary windings corresponding to the number of battery cells must be wound to satisfy the same conditions in the relationship with a primary winding, but it is difficult in practice to manufacture a transformer that satisfies these conditions due to the structure thereof.

Further, in the case where a battery pack or battery array, in which battery cells are stacked in multiple layers, is applied to devices that must be portable, devices added to the battery pack or battery array must provide support in order to minimize the size of the battery pack or battery array. However, since the conventional centralized charge equalization apparatus uses a single large-sized common core, it is difficult to integrate the battery pack or battery array.

DISCLOSURE

Technical Problem

Accordingly, the present invention has been made keeping in mind the above problems occurring in the prior art, and the present invention is intended to provide a charge equalization apparatus with the parallel connection of the primary windings of multiple transformers, which uses a number of transformers corresponding to the number of battery cells, and in which secondary windings are independently wound around respective transformers, thus facilitating the manufacture of transformers while maintaining charge equalization performance.

Further, the present invention is intended to provide a charge equalization apparatus with the parallel connection of the primary windings of multiple transformers, which uses a number of transformers corresponding to the number of battery cells, thus realizing design flexibility from the standpoint of spatial arrangement.

In addition, the present invention is intended to provide a charge equalization apparatus with the parallel connection of the primary windings of multiple transformers, which uses a number of transformers corresponding to the number of battery cells, thus easily coping with different characteristics of the secondary windings of the transformers so that secondary windings having different characteristics are made to have the same characteristics when the secondary windings have different characteristics.

Technical Solution

In accordance with an aspect of the present invention, there is provided a charge equalization apparatus, comprising N transformers, each having a primary winding and a secondary winding wound around the transformer, the primary windings of the transformers being connected in parallel with each other, the secondary windings of the transformers being connected in parallel with battery cells, N first current transfer devices connected in series with the secondary windings of the N transformers, respectively, N battery cells connected in series with each other, and connected in parallel with the secondary windings of the N transformers, the battery cells being constructed so that a first end of the N series-connected battery cells is connected to first ends of the parallel-connected primary windings of the N transformers, a first switch connected to the first ends of the parallel-connected primary windings of the N transformers, thus controlling flow of current of the primary windings in a first direction or a second direction, and a voltage sensing and switch drive signal generation unit for sensing voltages of the N battery cells and turning on/off the first switch, wherein the charge equalization apparatus is operated such that, when the first switch is turned on, current flows through the primary windings in the first direction, and current is induced in the secondary windings, thus enabling equalized charge to be distributed to the N battery cells.

ADVANTAGEOUS EFFECTS

The present invention is advantageous in that it facilitates the manufacture of a transformer while maintaining the charge equalization performance of a centralized charge equalization apparatus.

That is, since the conventional centralized charge equalization apparatus is constructed so that a number of secondary windings corresponding to the number of battery cells must be wound around a single large-sized common core, it is difficult to actually implement secondary windings as the number of battery cells increases. In contrast, the present invention uses a number of small-sized transformers corresponding to the number of battery cells, and enables secondary windings to be independently wound around respective transformers, thus facilitating the manufacture of transformers while maintaining the excellent charge equalization performance of the centralized charge equalization apparatus.

Further, the present invention is advantageous in that it uses a number of transformers corresponding to the number of battery cells, thus realizing design flexibility from the standpoint of spatial arrangement.

In addition, the present invention is advantageous in that it uses a number of transformers corresponding to the number of battery cells, thus easily coping with different characteristics of secondary windings so that secondary windings having different characteristics are made to have the same characteristics when they have different characteristics.

Figure 1:
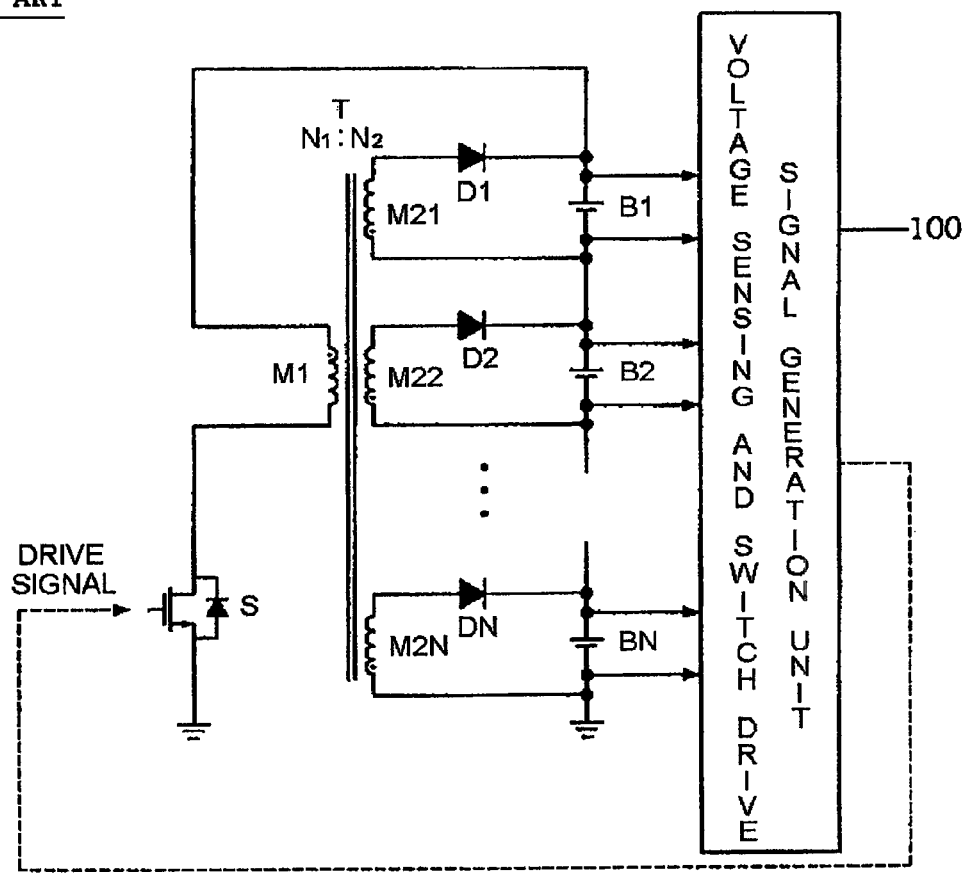
FIG. 1 is a diagram showing the construction of a conventional centralized charge equalization apparatus having series-connected battery cells.

<Description of reference characters of important parts>

T1~TN: transformer    M11~M1N: primary winding
M21~M2N, M21a~M2Nb: secondary winding
S, S1, S2: switch
B1~BN: battery cell    D1~DN, D11~DN2: diode
C1, C2: capacitor     L1~LN: inductor

BEST MODE

Figure 2:
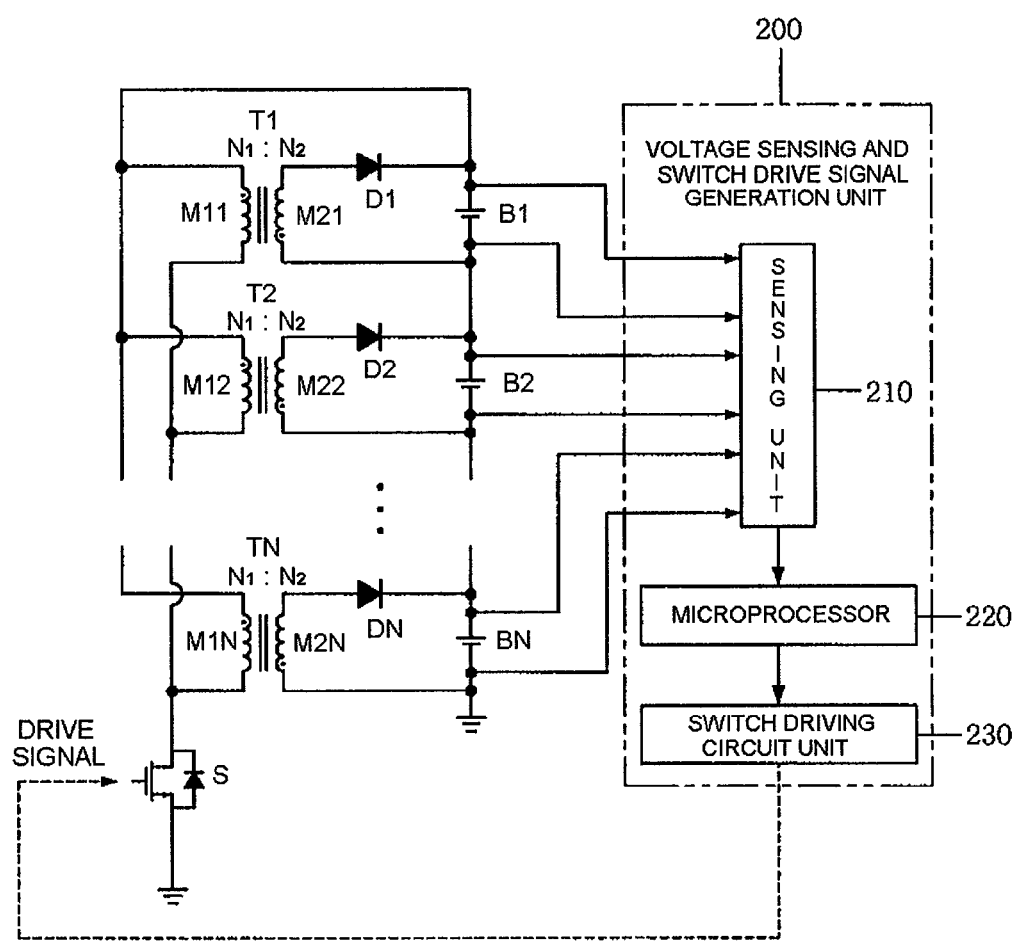
FIG. 2 is a diagram showing the construction of a charge equalization apparatus with the parallel connection of the primary windings of multiple transformers according to an embodiment of the present invention.

FIG. 2 is a diagram showing the construction of a charge equalization apparatus with the parallel connection of the primary windings of multiple transformers according to an embodiment of the present invention.

Referring to FIG. 2, the charge equalization apparatus with the parallel connection of the primary windings of multiple transformers is constructed so that transformers T1 to TN corresponding to battery cells B1 to BN are provided, respective cores are provided in the transformers T1 to TN, and primary windings M11 to M1N and secondary windings M21 to M2N are wound around respective cores.

That is, in the case of a conventional centralized charge equalization apparatus, a single primary winding is wound around a common core, and a number of secondary windings corresponding to the number of battery cells B1 to BN is wound around the common core. In contrast, in the present invention, a number of transformers T1 to TN corresponding to the number of battery cells B1 to BN is used, so that a number of cores corresponding to the number of battery cells B1 to BN is provided, and primary windings M11 to M1N and secondary windings M21 to M2N are wound around respective cores.

The primary windings M11 to M1N preferably have the same number of turns N1, but may have different numbers of turns according to the application. Further, in the present invention, since a number of transformers T1 to TN corresponding to the number of battery cells B1 to BN is used, cores are separately provided, and thus the turns ratio is more important from the standpoint of the relation to the secondary windings M21 to M2N. All of the transformers T1 to TN preferably have the same turns ratio of N1:N2, but may have different turns ratios according to the application. Here, the term 'turns ratio' means the ratio of the number of turns N1 in the primary windings to the number of turns N2 in the secondary windings, that is, N1:N2, and is related to the amount of voltage and current. The voltage of the primary windings and the voltage of the secondary windings are proportional to the number of turns, and the current of the primary windings and the current of the secondary windings are inversely proportional to the number of turns.

Further, the polarity of the primary windings M11 to M1N of all of the transformers T1 to TN is opposite that of the secondary windings M21 to M2N, which means that dots are marked on the lower portions of the secondary windings M21 to M2N of the transformers T1 to TN in the case where dots are marked on the upper portions of the primary windings M11 to M1N.

The primary windings M11 to M1N of all of the transformers T1 to TN are connected in parallel with each other, and the first ends of the parallel-connected primary windings M11 to M1N of the transformers T1 to TN are connected in series with a switch S.

The switch S performs ON/OFF operation in response to a control signal input from the switch driving circuit unit 230 of the voltage sensing and switch drive signal generation unit 200. The switch S may be implemented using a Metal Oxide Semiconductor Field Effect Transistor (MOSFET) switch having a body diode, or using a diode, a Bipolar Junction Transistor (BJT) switch or a relay switch, as alternatives to the MOSFET switch.

The secondary windings M21 to M2N preferably have the same number of turns, but may have different numbers of turns according to the application.

Further, the secondary windings M21 to M2N are connected in series with rectifier diodes D1 to DN, respectively, and are connected in parallel with the battery cells B1 to BN, respectively. In this case, the rectifier diodes D1 to DN prevent the flow of current when current flows from the dots in the secondary windings M21 to M2N, but do not prevent the flow of current when current flows into the dots in the secondary windings M21 to M2N. According to the application, the rectifier diodes D1 to DN can be replaced with MOSFET switches, BJT switches, relay switches, etc. The battery cells B1 to BN are charged to a certain voltage, are adapted to discharge or charge current, and are connected in parallel with the voltage sensing and switch drive signal generation unit 200. The battery cells B1 to BN are connected in series with each other, and the first end of the series-connected battery cells is connected in parallel with the primary windings M11 to M1N of the transformers T1 to TN.

Meanwhile, the voltage sensing and switch drive signal generation unit 200 includes a sensing unit 210, a microprocessor 220, and the switch driving circuit unit 230.

The sensing unit 210 is connected in parallel with respective battery cells B1 to BN, and is adapted to sense the voltages of respective battery cells B1 to BN and to output the sensed voltages.

The microprocessor 220 determines the time to turn on/off the switch S on the basis of the states of the voltages of respective battery cells B1 to BN, which are input from the sensing unit 210, according to a preset scheme.

In this case, as an example of the scheme by which the microprocessor 220 determines the ON/OFF time of the first switch S, determination may be performed so that, when the maximum and minimum values of the sensed voltages of the battery cells B1 to BN are obtained, and the difference therebetween is equal to or greater than a predetermined value, the microprocessor 220 can turn on the switch S.

As another example of the scheme, a determination may be performed so that, when the sensed voltages of the battery cells B1 to BN are higher than a reference value, the microprocessor 220 can turn on the switch S.

Meanwhile, when an ON signal is input from the microprocessor 220, the switch driving circuit unit 230 generates and outputs a drive signal required to turn on the switch S in response to the ON signal, whereas, when an OFF signal is input from the microprocessor 220, the switch driving circuit unit 230 generates and outputs a drive signal required to turn off the switch S in response to the OFF signal.

In this case, the drive signal generated by the switch driving circuit unit 230 may be a Pulse Width Modulated (PWM) signal.

With reference to FIG. 2, the operation of the charge equalization apparatus according to an embodiment of the present invention is described below.

The sensing unit 210 senses the voltages of respective battery cells B1 to BN and outputs the sensed voltages to the microprocessor 220.

The microprocessor 220 determines whether to turn on or off the switch S on the basis of the states of the voltages of respective battery cells B1 to BN, input from the sensing unit 210, according to a preset scheme, and outputs a drive control signal corresponding to the determination to the switch driving circuit unit 230.

When an ON signal is input from the microprocessor 220, the switch driving circuit unit 230 generates and outputs a drive signal required to turn on the switch S in response to the ON signal, whereas, when an OFF signal is input from the microprocessor 220, the switch driving circuit unit 230 generates and outputs a drive signal required to turn off the switch S in response to the OFF signal.

Meanwhile, when the switch S is turned on, current flows through the primary windings M11 to M1N of all of the transformers T1 to TN, and voltage is induced in corresponding secondary windings M21 to M2N, so that current is induced in a forward direction, that is, the direction from the dots of the secondary windings M21 to M2N to the outside of the transformers.

In this case, since the rectifier diodes D1 to DN are connected in the reverse direction relative to the flow of the current, this current is interrupted and is stored in the primary windings M21 to M2N in the form of magnetic energy.

Thereafter, when the switch S is turned off, current does not flow through the primary windings M11 to M1N, and voltage is not induced in the primary windings. However, in the secondary windings M21 to M2N, the magnetic energy, charged during the ON period of the switch S, is induced in the form of current in the direction in which energy flows into the dots of the secondary windings M21 to M2N, thus charging the battery cells B1 to BN, connected in parallel with respective secondary windings M21 to M2N, with charge. During this operation, since the rectifier diodes D1 to DN are connected in a forward direction relative to the flow of current, they do not prevent the flow of current.

Here, the amount of charge flowing into the battery cells B1 to BN is described. The amount of charge is proportional to the difference between the voltage induced in the secondary windings M21 to M2N and the voltage of the battery cells B1 to BN. When the voltage difference is small, a relatively small amount of charge moves to the battery cells compared to the case where the voltage difference is relatively large.

As a result, a relatively small amount of charge flows into a battery cell B1 to BN having a small difference between the voltage induced in the secondary windings M21 to M2N and the voltage of the battery cells B1 to BN, so that the battery cell is charged with a small amount of charge. A relatively large amount of charge flows into a battery cell B1 to BN, having a large difference between the voltage induced in the secondary windings M21 to M2N and the voltage of the battery cells B1 to BN, that is, the battery cell B1 to BN having a relatively low voltage, so that the battery cell B1 to BN is charged with a large amount of charge. Accordingly, the charged states of the battery cells are equalized.

Figure 3:
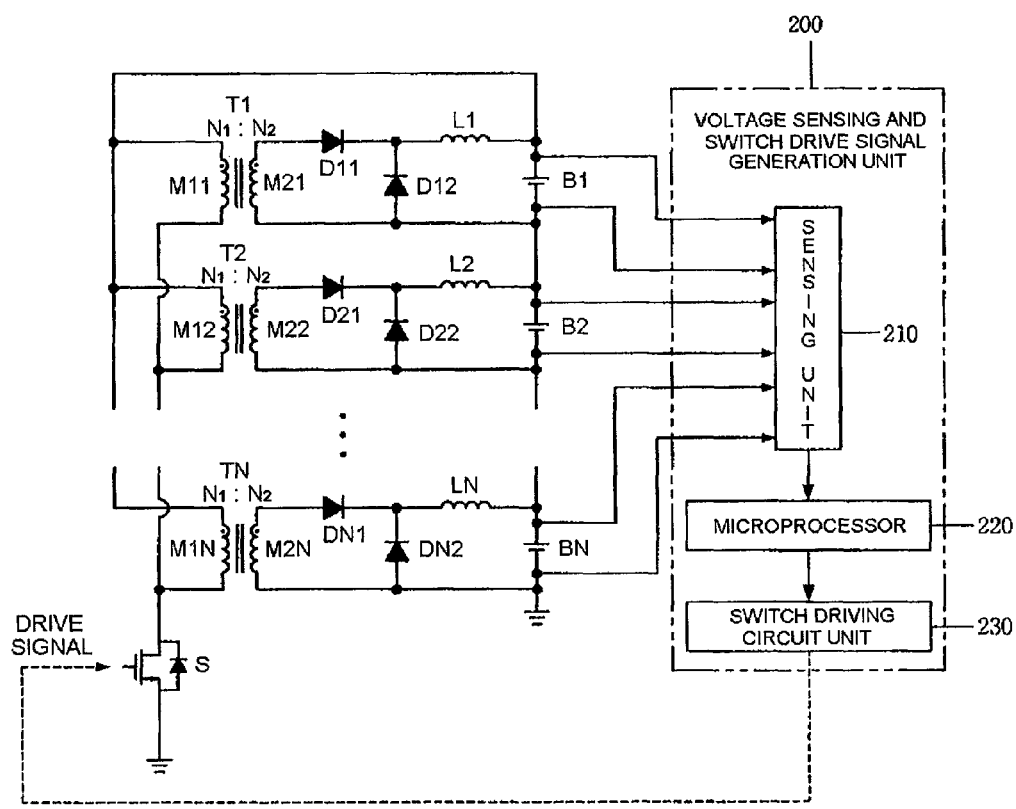
FIG. 3 is a diagram showing the construction of a charge equalization apparatus with the parallel connection of the primary windings of multiple transformers according to another embodiment of the present invention.

FIG. 3 is a diagram showing the construction of a charge equalization apparatus with the parallel connection of the primary windings of multiple transformers according to another embodiment of the present invention.

Referring to the drawing, the charge equalization apparatus with the parallel connection of the primary windings of multiple transformers is constructed so that transformers T1 to TN corresponding to battery cells B1 to BN are provided, respective cores are provided in the transformers T1 to TN, and primary windings M11 to M1N and secondary windings M21 to M2N are wound around respective cores.

The primary windings M11 to M1N preferably have the same number of turns N1, but may have different numbers of turns according to the application. Further, in the case of the turns ratio, indicating the relationship between the number of turns in the primary windings M11 to M1N and the number of turns in the secondary windings M21 to M2N, all of the transformers T1 to TN may have the same turns ratio N1:N2, but may alternatively have different turns ratios according to the application.

Further, the polarity of the primary windings M11 to MN of all of the transformers T1 to TN is the same as that of the secondary windings M21 to M2N, which means that, in the case where dots are marked on the upper portions of the primary windings M11 to M1N of the transformers T1 to TN, dots are also marked on the upper portions of the secondary windings M21 to M2N. In the charge equalization apparatus of FIG. 3, the flyback converters of FIG. 2 are replaced with forward converters.

Meanwhile, the primary windings M11 to M1N of all of the transformers T1 to TN are connected in parallel with each other, and the first ends of the parallel-connected primary windings M11 to M1N of the transformers T1 to TN are connected in series with a switch S.

The switch S performs ON/OFF operation in response to a drive signal input from the switch driving circuit unit 230 of a voltage sensing and switch drive signal generation unit 200.

Meanwhile, the secondary windings M21 to M2N preferably have the same number of turns N2, but may have different numbers of turns according to the application.

Further, the secondary windings M21 to M2N are connected in series with first rectifier diodes D11 to DN1, respectively, and are connected in parallel with second rectifier diodes D12 to DN2, respectively. The first rectifier diodes D11 to DN1 are connected so as not to prevent the flow of current when current flows out from the secondary windings M21 to M2N in a forward direction, and are connected to prevent the flow of current when current flows into the secondary windings M21 to M2N in a forward direction. Further, the second rectifier diodes D12 to DN2 are connected in parallel with the secondary windings M21 to M2N and function to induce the spontaneous flow of current through the secondary windings when the switch S is turned off. The cathodes of the first rectifier diodes D11 to DN1 are connected to the cathodes of the second rectifier diodes D21 to DN2.

The battery cells B1 to BN are connected in parallel with the secondary windings M21 to M2N, respectively, and are connected to the cathodes of the first rectifier diodes D11 to DN1 through inductors L1 to LN, respectively. That is, the inductors L1 to LN have first ends connected to the cathodes of the first rectifier diodes D1 to DN, and second ends connected to the battery cells B1 to BN, thus providing the connection between the first rectifier diodes D1 to DN and the battery cells B1 to BN.

Further, the battery cells B1 to BN are connected in series with each other, and the first end of the series-connected battery cells B1 to BN is connected in parallel with the primary windings M11 to M1N.

In this case, the inductors L1 to LN are used as means for transferring magnetic energy. When the switch S is turned on, current flowing out from the secondary windings M21 to M2N flows into respective battery cells B1 to BN through the inductors. When the switch S is turned off, magnetic energy remaining in the inductors flows into the battery cells B1 to BN in the same manner. At this time, the rectifier diodes D12 to DN2 are turned on.

Meanwhile, the voltage sensing and switch drive signal generation unit 200 includes a sensing unit 210, a microprocessor 220, and the switch driving circuit unit 230.

The sensing unit 210 is connected in parallel with respective battery cells B1 to BN and is adapted to sense the voltages of the battery cells B1 to BN and to output the sensed voltages.

Further, the microprocessor 220 determines the time to turn on/off the switch S on the basis of the voltage states of the battery cells B1 to BN, input from the sensing unit 210, according to a preset scheme.

In this case, as an example of the scheme by which the microprocessor 220 determines the ON/OFF time of the switch, determination may be performed so that, when the maximum and minimum values of the sensed voltages of the battery cells B1 to BN are obtained, and the difference therebetween is equal to or greater than a predetermined value, the switch S is turned on.

As another example of the scheme, determination may be performed so that, when the sensed voltages of the battery cells B1 to BN are greater than a reference value, the microprocessor 220 can turn on the switch S.

Meanwhile, when an ON signal is input from the microprocessor 220, the switch driving circuit unit 230 generates and outputs a driving signal required to turn on the switch S in response to the ON signal, whereas, when an OFF signal is input from the microprocessor 220, the switch driving circuit unit 230 generates and outputs a drive signal required to turn off the switch S in response to the OFF signal.

In this case, the drive signal generated by the switch driving circuit unit 230 may be a Pulse Width Modulated (PWM) signal.

Referring to FIG. 3, the operation of the charge equalization apparatus according to another embodiment of the present invention is described in detail.

The sensing unit 210 senses the voltages of respective battery cells B1 to BN and outputs the sensed voltages to the microprocessor 220.

The microprocessor 220 determines whether to turn on or off the switch S on the basis of the states of the voltages of the battery cells B1 to BN, which are input from the sensing unit 210, according to a preset scheme, and outputs a drive control signal corresponding to the determination to the switch driving circuit unit 230. Here, the method by which the microprocessor 220 turns on the switch S may include, for example, a method performed in the case where the potential of the series-connected battery cells B1 to BN is higher than a preset value or has the possibility of being higher than the preset value, and a method performed in the case where the potential of an arbitrary battery cell B1 to BN, constituting the series-connected battery cells B1 to BN, is higher than a preset value or has the possibility of being higher than the preset value, as another example. The former is the method performed in the case where only the total voltage of the series-connected battery cells B1 to BN is sensed, and the construction of the sensing unit 210 is simplified. However, the latter is the method performed in the case where the voltages of respective battery cells B1 to BN are sensed, and the construction of the sensing unit 210 is complicated.

Meanwhile, when an ON signal is input from the microprocessor 220, the switch driving circuit unit 230 generates and outputs a drive signal required to turn on the switch S in response to the ON signal, whereas, when an OFF signal is input from the microprocessor 220, the switch driving circuit unit 230 generates and outputs a drive signal required to turn off the switch S in response to the OFF signal.

Further, when the switch S is turned on, current flows through the primary windings M11 to M1N of all of the transformers T1 to TN by way of the battery cells B1 to BN, and voltages are induced in corresponding secondary windings M21 to M2N, so that current is generated in a forward direction, that is, a direction from the dots of the secondary windings M21 to M2N to the outside of the transformers.

In this case, the first rectifier diodes D1 to DN do not prevent the flow of this current, but the second rectifier diodes D12 to DN2 prevent the flow of this current, and thus a current loop, composed of the secondary windings M21 to M2N, the first rectifier diodes D11 to DN1, the inductors L1 to LN, and the battery cells B1 to BN, is formed, thus enabling the battery cells B1 to BN to be charged with the current. At this time, magnetic energy is charged in the inductors L1 to LN.

Thereafter, if the switch S is turned off, current does not flow through the primary windings M11 to M1N, and thus the current loop, composed of the first rectifier diodes D11 to DN1, the inductors L1 to LN, and the battery cells B1 to BN, is not formed any longer.

However, the magnetic energy, charged in the inductors L1 to LN during the ON period of the switch S, charges the battery cells B1 to BN. During this operation, since the first rectifier diodes D1 to DN are connected in a reverse direction relative to the flow of current, they prevent the flow of current, thus forming a current loop composed of the inductors L1 to LN, the second rectifier diodes D21 to DN2, and the battery cells B1 to BN.

The amount of charge flowing into the battery cells B1 to BN in this case is described. The amount of charge is proportional to the intensity of magnetic energy stored in the inductors L1 to LN. Further, the intensity of the magnetic energy is determined by the difference between the voltage induced in the secondary windings M21 to M2N, and the voltage of the battery cells B1 to BN during the ON period of the switch S. In detail, when the difference between the voltage induced in the secondary windings M21 to M2N and the voltage of the battery cells B1 to BN is large, a large amount of magnetic energy is stored in the inductors L1 to LN, whereas, when the difference is small, a small amount of magnetic energy is stored.

As a result, if the voltage of the battery cells B1 to BN is low, the battery cells are charged with a relatively large amount of charge, whereas, if the voltage of the battery cells B1 to BN is high, a relatively small amount of charge flows into the battery cells B1 to BN and charges the battery cells B1 to BN, thus equalizing charged states.

Figure 4:
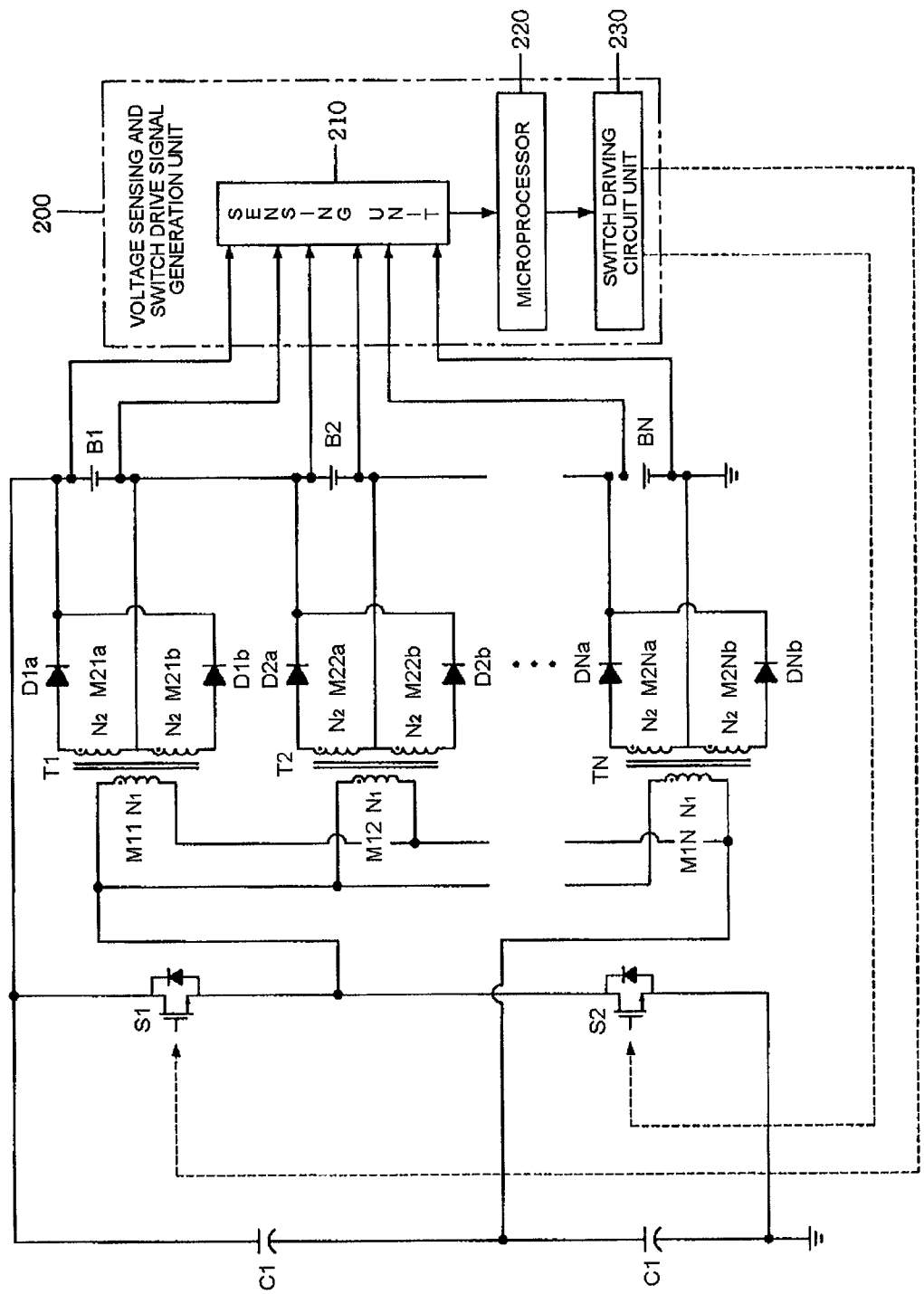
FIG. 4 is a diagram showing the construction of a charge equalization apparatus with the parallel connection of the primary windings of multiple transformers according to a further embodiment of the present invention.

FIG. 4 is a diagram showing the construction of a charge equalization apparatus with the parallel connection of the primary windings of multiple transformers according to a further embodiment of the present invention.

Referring to FIG. 4, the charge equalization apparatus with the parallel connection of the primary windings of multiple transformers is constructed so that transformers T1 to TN corresponding to battery cells B1 to BN are provided, respective cores are provided in the transformers T1 to TN, and a primary winding M11 to M1N and two secondary windings M21a to M2Nb are wound around each of the cores.

The primary windings M11 to M1N preferably have the same number of turns N1, but may have different numbers of turns according to the application. Further, in the case of the turns ratio indicating the relationship between the number of turns in the primary windings M11 to M1N and the number of turns in the secondary windings M21a to M2Nb, all of the transformers T1 to TN preferably have the same turns ratio (N1:N2), but they may alternatively have different turns ratios according to the application.

Further, the polarity of the primary windings M11 to M1N of all of the transformers T1 to TN is the same as that of the secondary windings M21a to M2Nb, which means that, in the case where dots are marked on the upper portions of the primary windings M11 to M1N of the transformers T1 to TN, dots are also marked on the upper portions of the secondary windings M21a to M2Nb.

Meanwhile, the primary windings M11 to MN of all of the transformers T1 to TN are connected in parallel with each other, and the first ends of the parallel-connected primary windings M11 to M1N are connected both to the source of a first switch S1 and to the drain of a second switch S2. The first switch S1 and the second switch S2 are connected in series with each other, the drain of the first switch S1 being connected to the anodes of the series-connected battery cells B1 to BN, the source of the second switch S2 being connected to the cathodes of the series-connected battery cells B1 to BN.

Further, the second ends of the primary windings M11 to MN are connected to the negative terminal of a first capacitor C1 and the positive terminal of a second capacitor C2. The first capacitor C1 and the second capacitor C2 are connected in series with each other, the positive terminal of the first capacitor C1 being connected to the anodes of the series-connected battery cells B1 to BN, and the negative terminal of the second capacitor C2 being connected to the cathodes of the series-connected battery cells B1 to BN.

In this case, the first and second switches S1 and S2 perform ON/OFF operation in response to a drive signal input from the switch driving circuit unit 230 of a voltage sensing and switch drive signal generation unit 200.

Meanwhile, the secondary windings M21a to M2Nb preferably have the same number of turns N1, but may have different numbers of turns according to the application.

Further, the secondary windings M21a to M2Nb are each implemented such that two windings are wound around a single core. The first windings M21a to M2Na and the second windings M21b to M2Nb of the secondary windings are connected in parallel with the battery cells B1 to BN, respectively.

The first windings M21a to M2Na and the second windings M21b to M2Nb of the secondary windings M21a to M2Nb are connected in series with first or second rectifier diodes D1a to DNb.

The first rectifier diodes D1a to DNa are connected so as not to prevent the flow of current when current flows out in a forward direction in the relationship with the first primary windings M21a to M2Na, and so as to prevent the flow of current when current flows out in a forward direction in the relationship with the second windings M21b to M2Nb. The second rectifier diodes D1b to DNb are connected so as to prevent the flow of current when current flows out in a forward direction in the relationship with the first windings M21a to M2Na, and so as not to prevent the flow of current when current flows into the second windings M21b to M2Nb in a forward direction in the relationship with the second windings M21b to M2Nb.

Meanwhile, the voltage sensing and switch drive signal generation unit 200 includes a sensing unit 210, a microprocessor 220, and the switch driving circuit unit 230.

The sensing unit 210 is connected in parallel with the battery cells B1 to BN, and is adapted to sense the voltages of respective battery cells B1 to BN and to output the sensed voltages.

The microprocessor 220 determines the time to turn on/off the first and second switches S1 and S2 on the basis of the states of the voltages of the battery cells B1 to BN, which are input from the sensing unit 210, according to a preset scheme.

In this case, as an example of the scheme by which the microprocessor 220 determines the ON/OFF time of the first and second switches S1 and S2, determination may be performed so that, when the maximum and minimum values of the sensed voltages of the battery cells B1 to BN are obtained, and the difference therebetween is equal to or greater than a predetermined value, the microprocessor 220 can turn on the first and second switches S1 and S2.

As another example of the scheme, determination may be performed so that, when the sensed voltages of the battery cells B1 to BN are higher than a reference value, the microprocessor 220 can turn on the first and second switches S1 and S2.

Meanwhile, when an ON signal is input from the microprocessor 220, the switch driving circuit unit 230 generates and outputs a driving signal required to turn on the first and second switches S1 and S2 in response to the ON signal, whereas, when an OFF signal is input from the microprocessor 220, the switch driving circuit unit 230 generates and outputs a drive signal required to turn off the first and second switches S1 and S2 in response to the OFF signal.

In this case, the drive signal generated by the switch driving circuit unit 230 may be a Pulse Width Modulated (PWM) signal.

Referring to FIG. 4, the operation of the charge equalization according to a further embodiment of the present invention is described below.

The sensing unit 210 senses the voltages of respective battery cells B1 to BN and outputs the sensed voltages to the microprocessor 220.

The microprocessor 220 determines whether to turn on or off the first and second switches S1 and S2 on the basis of the states of the voltages of the battery cells B1 to BN, which are input from the sensing unit 210, according to a preset scheme, and outputs a drive control signal corresponding to the determination to the switch driving circuit unit 230.

Then, when an ON signal is input from the microprocessor 220, the switch driving circuit unit 230 generates and outputs a drive signal required to turn on the first or second switch S1 or S2 in response to the ON signal, whereas, when an OFF signal is input from the microprocessor 220, the switch driving circuit unit 230 generates and outputs a drive signal required to turn off the first or second switch S1 or S2.

Meanwhile, when the first switch S1 is turned on, current flows through the primary windings M11 to M1N of all of the transformers T1 to TN by way of the battery cells B1 to BN, voltage is applied to the primary windings, and voltages are induced in the first windings M21a to M2Na and the second windings M21b to M2Nb of corresponding secondary windings M21a to M2Nb, so that current is generated in a forward direction, that is, the direction from the dots of the secondary windings M21a to M2Nb to the outside of the transformers.

In this case, the first rectifier diodes D1a to DNa do not prevent the flow of current, but the second rectifier diodes D1b to DNb prevent the flow of current, so that a current loop composed of the first windings M21a to M2Na of the secondary windings M21a to M2Nb, the first rectifier diodes D1a to DNa, and the battery cells B1 to BN is formed, thus charging the battery cells B1 to BN with this current.

Thereafter, when the first switch S1 is turned off, current does not flow through the primary windings M11 to M1N, voltage is not induced in the primary windings, and current does not flow through the secondary windings M21a to M2Nb either.

The amount of charge flowing into the battery cells B1 to BN during the ON period of the first switch S1 in this case is described. The amount of charge is proportional to the difference between the voltage induced in the secondary windings M21a to M2Nb and the voltage of the battery cells B1 to BN. When the voltage difference is small, a relatively small amount of charge moves to the battery cells compared to the case where the voltage difference is large.

As a result, a small amount of charge flows into a battery cell B1 to BN having a small difference between the voltage induced in the secondary windings M21a to M2Nb and the voltage of the battery cells B1 to BN, and thus charges the battery cell B1 to BN. A large amount of charge flows into a battery cell having a large difference between the voltage induced in the secondary windings M21a to M2Nb and the voltage of the battery cell B1 to BN-a battery cell B1 to BN having a relatively low voltage-, and thus charges the battery cell B1 to BN. Accordingly, the charged states of the battery cells are equalized.

Meanwhile, when the second switch S2 is turned on, current flows through the primary windings M11 to MN of the transformers T1 to TN in a direction opposite the direction in which current flows by way of the battery cells B1 to BN when the first switch S1 is turned on, and voltage is applied to the primary windings. Accordingly, voltages are induced in the first windings M21a to M2Na and second windings M21b to M2Nb of corresponding secondary windings M21a to M2Nb, so that current is generated in a reverse direction, that is, the direction from the outside of the transformers to the dots of the secondary windings M21a to M2Nb.

In this case, since the first rectifier diodes D1a to DNa prevent the flow of current, and the second rectifier diodes D1b to DNb do not prevent the flow of current, a current loop composed of the second windings M21b to M2Nb of the secondary windings M21a to M2Nb, the second rectifier diodes D1b to DNb, and the battery cells B1 to BN is formed, thus charging the battery cells B1 to BN with the current.

Thereafter, when the second switch S2 is turned off, current does not flow through the primary windings M11 to M1N, voltage is not induced in the primary windings, and current does not flow through the secondary windings M21a to M2Nb either.

Here, the amount of charge flowing into the battery cells B1 to BN during the ON period of the second switch S2 is described. The amount of charge is proportional to the difference between the voltage induced in the secondary windings M21a to M2Nb and the voltage of the battery cells B1 to BN. When the voltage difference is small, a relatively small amount of charge moves to the battery cells compared to the case where the voltage difference is large.

As a result, a small amount of charge flows into a battery cell B1 to BN having a small difference between the voltage induced in the secondary windings M21a to M2Nb and the voltage of the battery cells B1 to BN, and thus charges the battery cell B1 to BN. A large amount of charge flows into a battery cell having a large difference between the voltage induced in the secondary windings M21a to M2Nb and the voltage of the battery cell B1 to BN, that is, the battery cell B1 to BN having a relatively low voltage, and thus charges the battery cell B1 to BN. Accordingly, the charged states of the battery cells are equalized.

Moreover, the above-described charge equalization apparatus can perform a charge equalization operation when the potentials of respective battery cells, which are connected in series with each other, are different from each other in the situation in which an electrical charging device or an electrical load is not connected to the series-connected battery cells. However, even if an electrical charging device or electrical load is connected, a charge equalization operation can also be performed even in the situation in which an electrical charging device or an electrical load is connected when a current carrying capacity is sufficiently large to allow the primary windings of transformers and switches to function as a bypass circuit, or when the amount of charge current or discharge current is small.

The invention claimed is:

1. A charge equalization apparatus, comprising:
multiple transformers, each having a primary winding and a secondary winding wound around the transformer, the primary windings of the transformers being connected in parallel with each other, the secondary windings of the transformers being connected in parallel with battery cells;
wherein the primary windings and the secondary windings of the multiple transformers form flyback converters;
multiple first current transfer devices connected in series with the secondary windings of the multiple transformers, respectively;
multiple battery cells connected in series with each other, and connected in parallel with the secondary windings of the multiple transformers, the battery cells being constructed so that a first end of the multiple series-connected battery cells is connected to first ends of the parallel-connected primary windings of the multiple transformers;
a first switch connected to the first ends of the parallel-connected primary windings of the multiple transformers, thus controlling flow of current of the primary windings in a first direction or a second direction; and
a voltage sensing and switch drive signal generation unit for sensing voltages of the multiple battery cells and turning on/off the first switch,
wherein the charge equalization apparatus is operated such that, when the first switch is turned on, current flows through the primary windings in the first direction, and current is induced in the secondary windings, thus enabling equalized charge to be distributed to the multiple battery cells; and
wherein the polarity of the primary winding in the multiple transformers is opposite to the one of the secondary winding;
when the first switch is on, the first current transfer devices prevent the current flow and store the magnetic energy on the secondary winding;
when the first switch is off, the magnetic energy stored on the secondary winding charges the battery cell so that the charge becomes equalized.

2. The charge equalization apparatus according to claim 1, wherein the multiple transformers have a same turns ratio.

3. The charge equalization apparatus according to claim 1, wherein the first switch is a semiconductor switching device.

4. A charge equalization apparatus, comprising:
multiple transformers, each having a primary winding and a secondary winding wound around the transformer, the primary windings of the transformers being connected in parallel with each other, the secondary windings of the transformers being connected in parallel with battery cells;
multiple first current transfer devices connected in series with the secondary windings of the multiple transformers, respectively;
multiple battery cells connected in series with each other, and connected in parallel with the secondary windings of the multiple transformers, the battery cells being constructed so that a first end of the multiple series-connected battery cells is connected to first ends of the parallel-connected primary windings of the multiple transformers;

a first switch connected to the first ends of the parallel-connected primary windings of the multiple transformers, thus controlling flow of current of the primary windings in a first direction or a second direction; and a voltage sensing and switch drive signal generation unit for sensing voltages of the multiple battery cells and turning on/off the first switch, wherein the charge equalization apparatus is operated such that, when the first switch is turned on, current flows through the primary windings in the first direction, and current is induced in the secondary windings, thus enabling equalized charge to be distributed to the multiple battery cells;

wherein the primary windings and the secondary windings of the multiple transformers are coupled to each other in structures of forward converters, the charge equalization apparatus further comprising multiple second current transfer devices connected in parallel with the secondary windings of the multiple transformers, and provided with cathodes connected to cathodes of the first current transfer devices; further comprising multiple inductors interposed between the cathodes of the first current transfer devices and the battery cells, respectively;

wherein the polarity of the primary winding in the multiple transformers is same with the one of the secondary winding;

when the first switch is on, the current flow from the secondary winding charges the battery cell through the first current transfer devices and the inductor;

when the first switch is off, the magnetic energy stored on the inductor charges the battery cell through the current loop comprising the inductor, the second current transfer devices, and the battery cell.

5. A charge equalization apparatus, comprising:

multiple transformers, each having a primary winding and a secondary winding wound around the transformer, the primary windings of the transformers being connected in parallel with each other, the secondary windings of the transformers being connected in parallel with battery cells;

multiple first current transfer devices connected in series with the secondary windings of the multiple transformers, respectively;

multiple battery cells connected in series with each other, and connected in parallel with the secondary windings of the multiple transformers, the battery cells being constructed so that a first end of the multiple series-connected battery cells is connected to first ends of the parallel-connected primary windings of the multiple transformers;

a first switch connected to the first ends of the parallel-connected primary windings of the multiple transformers, thus controlling flow of current of the primary windings in a first direction or a second direction; and a voltage sensing and switch drive signal generation unit for sensing voltages of the multiple battery cells and turning on/off the first switch, wherein the charge equalization apparatus is operated such that, when the first switch is turned on, current flows through the primary windings in the first direction, and current is induced in the secondary windings, thus enabling equalized charge to be distributed to the multiple battery cells;

wherein the primary windings and the secondary windings of the multiple transformers are implemented in structures of half-bridge converters;

wherein the primary windings of the multiple transformers are respectively wound around first portions of multiple cores of the multiple transformers, the secondary windings of the multiple transformers are implemented using respective pairs of secondary windings, wound around second portions of the multiple cores of the multiple transformers so that the pairs of the secondary windings are connected in parallel with respective battery cells, the first current transfer devices are implemented using respective pairs of first current transfer devices, connected in series with the pairs of secondary windings, and the first switch is implemented using a pair of first switches required to control respective pairs of secondary windings; and wherein when one of a pair of first switches is one, the current flows in the primary windings of a number of transformers by means of the battery cell and accordingly voltage is induced in the first winding and the second winding of corresponding secondary winding and current is generated to the forward direction and thus current is charged in the battery cell;

when the other switch is on, the current flows in the primary windings of a number of transformers by means of the battery cell to the contrary direction from the direction when the above switch is on, and accordingly voltage is induced in the first winding and the second winding of corresponding secondary winding and current is generated to the reverse direction and thus current is charged in the battery cell.

6. The charge equalization apparatus according to claim 5, wherein the pair of first switches is constructed such that one is connected to first ends of the primary windings connected in parallel with the battery cells, and a remaining one is connected to second ends of the primary windings connected in parallel with the battery cells.

\* \* \* \* \*